June 28, 1938.  W. B. CLITHEROW  2,122,088
TEMPERING OF GLASS
Filed Sept. 6, 1935
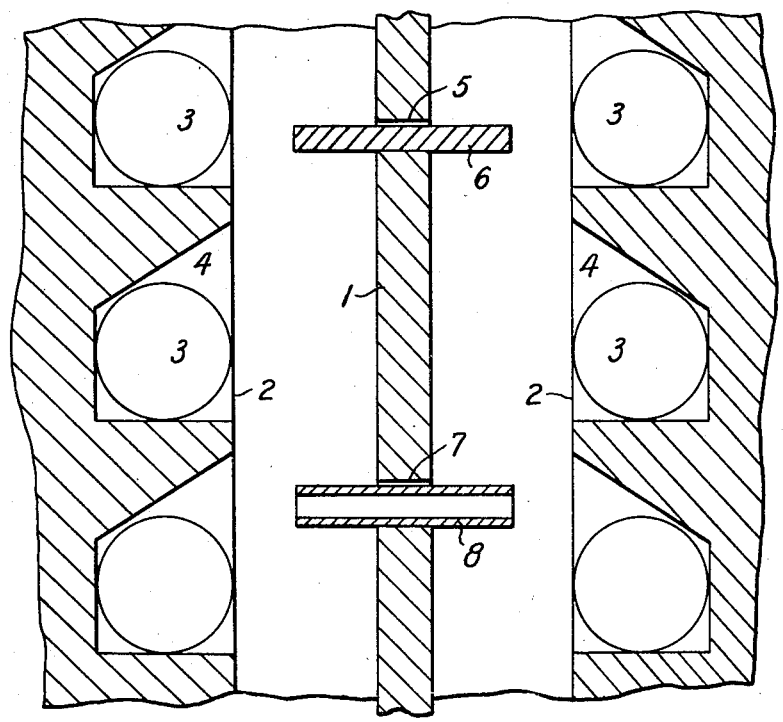
INVENTOR.
William Borthwick Clitherow
by Dusey & Cole
Attorneys Patented June 28, 1938

2,122,088

UNITED STATES PATENT OFFICE 2,122,088

TEMPERING OF GLASS

William Borthwick Clitherow, St. Helens, England, assignor to The American Securit Company, Wilmington, Del., a company of Delaware Application September 6, 1935, Serial No. 39,483
In Great Britain September 8, 1934

2 Claims. (Cl. 49—89)

This invention relates to the tempering of glass and has for its object a process and apparatus for tempering flat plates and other articles of glass having small holes. As is well known in the art, tempering of glass contemplates a heating of the glass to the softening point and thereafter rapidly cooling or chilling the same.

It is often desired to temper plates of glass having small holes, provided for the screws by which the plates are to be secured. It has been found that when such plates are subjected to the process customary for plates without holes, they are liable to break. They can be tempered effectively, that is to say, tempered to such a degree that they shatter into small pieces when broken, by heating them slowly enough, but such slow heating, besides being uneconomical, entails a special furnace and treatment for plates with holes, since a plate with holes cannot safely undergo the routine treatment in a tempering installation of a plate without holes.

This difficulty found in tempering plates with holes depends on the size of hole in relation to the thickness of the glass and on the kind of glass. The difficulty arises when the size of hole in relation to the thickness of the glass is such that heat cannot reach all the interior surface of the hole by radiation through the air from the heating means of the tempering furnace. The difficulty is especially great in the case of black glass and in glass which does not readily transmit radiant heat from the furnace.

According to the invention, before inserting the glass into the heating furnace, a copper or other heat conducting member is inserted in each hole, extending beyond the surfaces of the glass, whereby its surface outside the glass absorbs heat from the furnace and raises the temperature of the portion of the member inside the glass.

The accompanying drawing is a vertical section through a portion of a glass plate in a furnace.

The glass plate 1 is in the furnace 2 which is heated by electrical heating elements 3 lying in recesses 4 in the furnace walls. In the small hole 5, in the glass plate 1, a metal rod 6 is inserted loosely, and in the larger hole 7, a metal tube 8 is inserted. The rod 6 and the tube 8 are both substantially longer than the thickness of the plate 1, so that their portions extending beyond the surface of the glass absorb heat from the furnace and thereby the temperature of the portions inside the holes 5 and 7 is raised sufficiently to heat the glass about the holes to the temperature necessary for effective tempering.

Having described my invention, I declare that what I claim and desire to secure by Letters Patent is:—

1. The process of effectively heating glass pierced with small holes, which consists in inserting in each hole a heat conducting member extending beyond the surfaces of the glass, and then heating the glass and members while said members are in place.

2. The process for effectively tempering glass pierced with small holes, which consists in inserting in each hole a heat conducting member extending beyond the surfaces of the glass, heating the glass and members while the said members are in place and then rapidly cooling the glass.

WILLIAM BORTHWICK CLITHEROW.